F. A. STUART.
Grain Cleaner.
No. 4,586. Patented June 20, 1846.
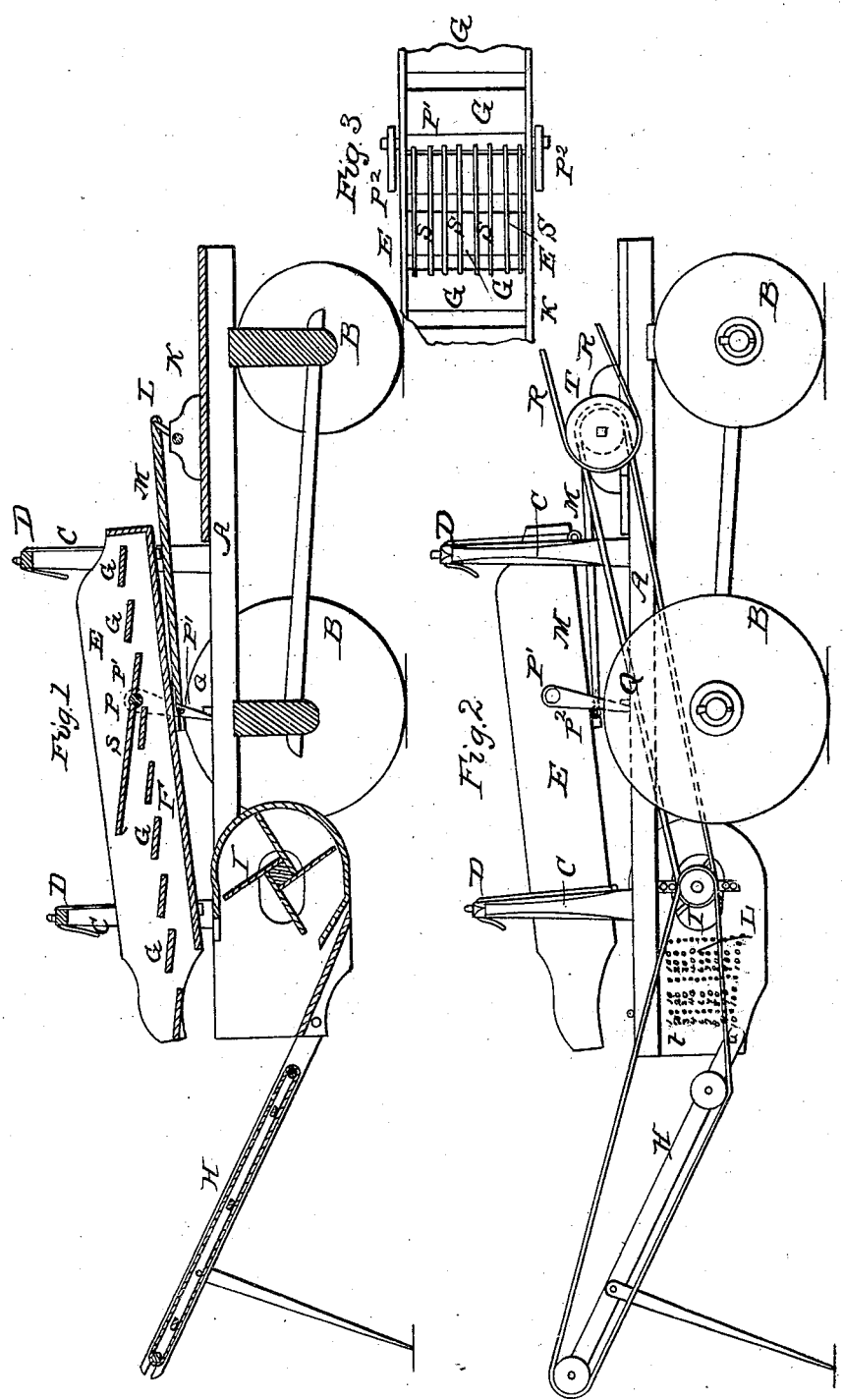

UNITED STATES PATENT OFFICE.

FREDK. A. STUART, OF CATHARINE, NEW YORK.

WINNOWING-MACHINE.

Specification of Letters Patent No. 4,586, dated June 20, 1846.

*To all whom it may concern:*

Be it known that I, FREDERICK A. STUART, of Catharine, in the county of Chemung and State of New York, have invented a new and useful Improvement in Machines for Cleaning Grain, which is described as follows, reference being had to the annexed drawings of the same, making part of this description.

Figure 1 is a vertical longitudinal section of the machine through the center of the same. Fig. 2 is a side elevation. Fig. 3 is a section or plan of the trough and vibrating shaker.

This improvement is designed to separate the straw and chaff from the grain and convey them off together at the rear end of the machine, the grain being made to descend through a blast of wind from a common winnowing machine to an inclined spout that conveys it to a receiver. To accomplish this object I place a rectangular frame A on four wheels B; into the sides of which frame are mortised and tenoned four posts C, supporting two caps D, from which is suspended by four straps an inclined swinging trough E having a tight bottom F and an open, latticed, reticulated, or perforated bottom G placed a few inches above the last named bottom to permit the grain to drop through upon the solid bottom F; and to conduct the straw to an endless revolving conveyer H, the grain passing the whole length of the trough to the winnowing machine, I where the chaff is blown from it and into the straw and then to the endless conveyer H which conveys it away to any place desired.

The threshing machine for threshing the grain from the straw is placed on the forward end of the frame at K and delivers the grain and straw as threshed to the trough.

The winnowing machine I is made in the usual manner and is placed under the hind and lower end of the trough. The before described inclined swinging trough E is provided with a vibrating shaker P for shaking or cleaning the straw from any grain that may remain in it, as it passes down the inclined vibrating trough, a description of which is as follows: Near the upper end of the trough and transversely is placed a rocking shaft P' the axles of which turn in the sides of the inclined trough and project outward and through said sides for the purpose of receiving two-right-angled arms $P^2$ pointing downward to the tops of the two horizontal timbers or bearers of the frame A, and coming in contact with cogs or stops Q, Q, placed thereon, simultaneous, which gives to the shaft a rocking or vibratory motion, said shaft having a series of wire teeth or rods S inserted into said roller similar to a rake and pointing toward the lower or back end of the trough as shown in Fig. 3, the shaft or rake-head being placed between, and on a line with the tops of a pair of the slats or open latticed bottom G in order that the wire rods or teeth S may lay on the top of said open bottom to allow the straw to pass over and be subjected to the shaking operation. This shaking movement is produced by the vibration of the inclined swinging trough E, which in the act of receiving the arms $P^2$ of the shaker will come in contact with cogs Q set in the tops of the horizontal timbers and cause the wire teeth or rods to rise and fall in quick succession as the straw passes over, thereby shaking and freeing the straw from grain that might otherwise remain on it, and pass off the endless conveyer.

The threshing and winnowing machines are propelled by the usual description of strap and pulley gearing. Also the endless conveyer is propelled by the same kind of gearing.

The trough is vibrated or shaken by a crank L and pitman rod M connected to it and driven by a band R leading from a pulley T on the crank axle to a pulley on the axle of the threshing cylinder of a common threshing machine placed on the frame at K.

A table to count from 1 to 1110 bushels may be placed on the side of the winnowing machine for ascertaining the exact number of bushels of grain cleaned, by inserting a pin *t* into holes in the side of the box or winnowing machine opposite the several numbers or combination of numbers of the said table.

The machine before described is drawn on the four wheels from place to place, or from farm to farm and remains on the same during the operations of threshing and cleaning, being propelled by the same animals that draw it from place to place.

What I claim as my invention and desire to secure by Letters Patent is—

The combination of the vibrating shaker P with the inclined swinging trough E as described and for the purpose set forth.

FREDERICK A. STUART.

Witnesses:
WM. P. ELLIOT,
A. E. H. JOHNSON.